United States Patent
Raikov et al.

(10) Patent No.: US 11,507,432 B2
(45) Date of Patent: *Nov. 22, 2022

(54) METHODS, SYSTEMS AND APPARATUS FOR CLIENT EXTENSIBILITY DURING PROVISIONING OF A COMPOSITE BLUEPRINT

(71) Applicant: VMware, Inc., Palo Alto, CA (US)

(72) Inventors: Ventsyslav Raikov, Sofia (BG); Boris Savov, Sofia (BG); Rostislav Georgiev, Sofia (BG); Rosen Spasov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,814

(22) Filed: Aug. 2, 2021

(65) Prior Publication Data
US 2022/0043693 A1    Feb. 10, 2022

Related U.S. Application Data

(63) Continuation of application No. 15/692,096, filed on Aug. 31, 2017, now Pat. No. 11,080,098.

(51) Int. Cl.
*G06F 9/50*     (2006.01)
*G06F 9/455*    (2018.01)
(Continued)

(52) U.S. Cl.
CPC ........ *G06F 9/5077* (2013.01); *G06F 9/45558* (2013.01); *H04L 41/0806* (2013.01);
(Continued)

(58) Field of Classification Search
CPC ............... G06F 9/5077; G06F 9/45558; H04L 41/0806; H04L 41/5048; H04L 41/5051;
(Continued)

(56) References Cited

U.S. PATENT DOCUMENTS 8,799,469 B2    8/2014  Bedi et al.
11,080,098 B2   8/2021  Raikov et al.
(Continued)

OTHER PUBLICATIONS

United States Patent and Trademark Office "Final Office Action" mailed in connection with U.S. Appl. No. 15/692,096 dated May 4, 2020, 13 pages.
(Continued)

*Primary Examiner* — Esther B. Henderson
*Assistant Examiner* — Nazia Naoreen
(74) *Attorney, Agent, or Firm* — Hanley, Flight & Zimmerman, LLC

(57) ABSTRACT

Methods, apparatus and articles of manufacture to provide client extensibility during provisioning of a composite blueprint are disclosed. An example virtual appliance in a cloud computing environment includes an orchestrator to facilitate provisioning of a virtual computing resource based on a blueprint, the provisioning associated with an event defined by the blueprint. The example virtual appliance also includes an event broker to maintain a set of subscribers to the event broker, each of the set of subscribers further subscribing to at least one event topic through the event broker, the event broker to trigger a notification of a first subscriber to a first event topic associated with the event when the event broker determines that the first subscriber is a blocking subscriber for the first event topic, the event broker to facilitate modification of the event by a blocking subscriber but not by a non-blocking subscriber.

17 Claims, 17 Drawing Sheets

(51) Int. Cl.
*H04L 12/24* (2006.01)
*H04L 29/08* (2006.01)
*H04L 29/06* (2006.01)
*H04L 12/911* (2013.01)
*H04L 41/0806* (2022.01)
*H04L 67/10* (2022.01)
*H04L 47/70* (2022.01)
*H04L 67/1004* (2022.01)
*H04L 41/5051* (2022.01)
*H04L 41/5041* (2022.01)
*H04L 67/01* (2022.01)
*H04L 67/562* (2022.01)
*H04L 41/50* (2022.01)

(52) U.S. Cl.
CPC ...... *H04L 41/5048* (2013.01); *H04L 41/5051* (2013.01); *H04L 47/70* (2013.01); *H04L 67/01* (2022.05); *H04L 67/10* (2013.01); *H04L 67/1004* (2013.01); *H04L 67/562* (2022.05); *G06F 2009/4557* (2013.01); *G06F 2009/45595* (2013.01); *H04L 41/5096* (2013.01)

(58) Field of Classification Search
CPC ..... H04L 47/70; H04L 67/10; H04L 67/1004; H04L 67/2809; H04L 67/42
See application file for complete search history.

(56) References Cited

U.S. PATENT DOCUMENTS

| | | | |
|---|---|---|---|
| 2008/0133337 A1* | 6/2008 | Fletcher | G06F 16/958 707/E17.116 |
| 2008/0134202 A1* | 6/2008 | Craggs | G06F 9/546 719/318 |
| 2013/0013676 A1* | 1/2013 | Blair | G06Q 20/1235 709/203 |
| 2016/0239595 A1* | 8/2016 | Maes | G06F 9/5061 |
| 2017/0332421 A1* | 11/2017 | Sternberg | H04W 76/11 |
| 2018/0189303 A1* | 7/2018 | Mankovskii | G06Q 10/06 |

OTHER PUBLICATIONS

United States Patent and Trademark Office "Non-Final Office Action" mailed in connection with U.S. Appl. No. 15/692,096 dated Oct. 9, 2020, 18 pages.

United States Patent and Trademark Office "Non-Final Office Action" mailed in connection with U.S. Appl. No. 15/692,096 dated Oct. 24, 2019, 18 pages.

United States and Trademark Office "Notice of Allowance" mailed in connection with U.S. Appl. No. 15/692,096 dated Mar. 30, 2021, 6 pages.

* cited by examiner

NEW WORKFLOW SUBSCRIPTION

| EVENT TOPIC | CONDITIONS | WORKFLOW | DETAILS |

*NAME: DUMMY

*PRIORITY: 10

TIMEOUT(MIN):

DESCRIPTION:

☒ BLOCKING ⓘ
— 902

ADMINISTRATION

EVENT LOGS

SUBSCRIPTIONS

NEW WORKFLOW SUBSCRIPTION

| EVENT TOPIC | CONDITIONS | WORKFLOW | DETAILS |

ADMINISTRATION

EVENT LOGS

SUBSCRIPTIONS

SELECT AN EVENT TOPIC: — 1004

SELECTED EVENT TOPIC DETAILS: — 1006

BLUEPRINT COMPONENT COMPLETED

TOPIC ID: Com.vmware.cap.component.cafe.composition.completed
NAME: BLUEPRINT COMPONENT COMPLETED
DESCRIPTION: EVENTS FIRED WHEN A COMPONENT OF A COMPOSITE BLUEPRINT IS COMPLETED, SUCH AS PROVISIONING A VM OR SOFTWARE COMPONENT INSTALL
PUBLISHER: COMPOSITION-SERVICE
BLOCKABLE: YES
REPLYABLE: NO

| NAME ▲ |
|---|
| BLUEPRINT COMPONENT COMPLETED |
| BLUEPRINT COMPONENT REQUESTED |
| BLUEPRINT CONFIGURATION |
| BUSINESS GROUP CONFIGURATION |
| CATALOG ITEM REQUEST COMPLETED |
| CATALOG ITEM REQUEST |
| COMPONENT ACTION COMPLETED |
| COMPONENT ACTION REQUESTED |
| COMPUTE NAME ASSIGNMENT |
| COMPUTE PROVISION |
| COMPUTE RESOUCE REMOVAL |
| CONTAINERALLOCATIONTASKSLATE |
| CONTAINER NAME ASSIGNMENT |

| SCHEMA ▲ |
|---|
| SUBTENANT – BUSINESS GROUP |
| REQUESTID – REQUEST ID |
| TASKTYPE – TASK TYPE |
| COMPONENTID – COMPONENT ID |
| CLUSTERINDEX – CLUSTER INDEX |

1000, 1002

METHODS, SYSTEMS AND APPARATUS FOR CLIENT EXTENSIBILITY DURING PROVISIONING OF A COMPOSITE BLUEPRINT

CROSS-REFERENCE TO RELATED APPLICATIONS

This patent claims priority as a continuation to U.S. Non-Provisional application Ser. No. 16/047,293 entitled "METHODS, SYSTEMS AND APPARATUS FOR CLIENT EXTENSIBILITY DURING PROVISIONING OF A COMPOSITE BLUEPRINT" which was filed on Aug. 31, 2018 is hereby incorporated herein by reference in its entirety.

FIELD OF THE DISCLOSURE

The present disclosure relates generally to computing system virtualization, and, more particularly, to methods and apparatus for client extensibility during provisioning of a composite blueprint.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

FIGS. 8-15 illustrate example graphical user interfaces for interaction to manage workflow subscriptions for provisioning events.

The figures are not to scale. Wherever possible, the same reference numbers will be used throughout the drawing(s) and accompanying written description to refer to the same or like parts, elements, etc.

DETAILED DESCRIPTION

Figure 1:
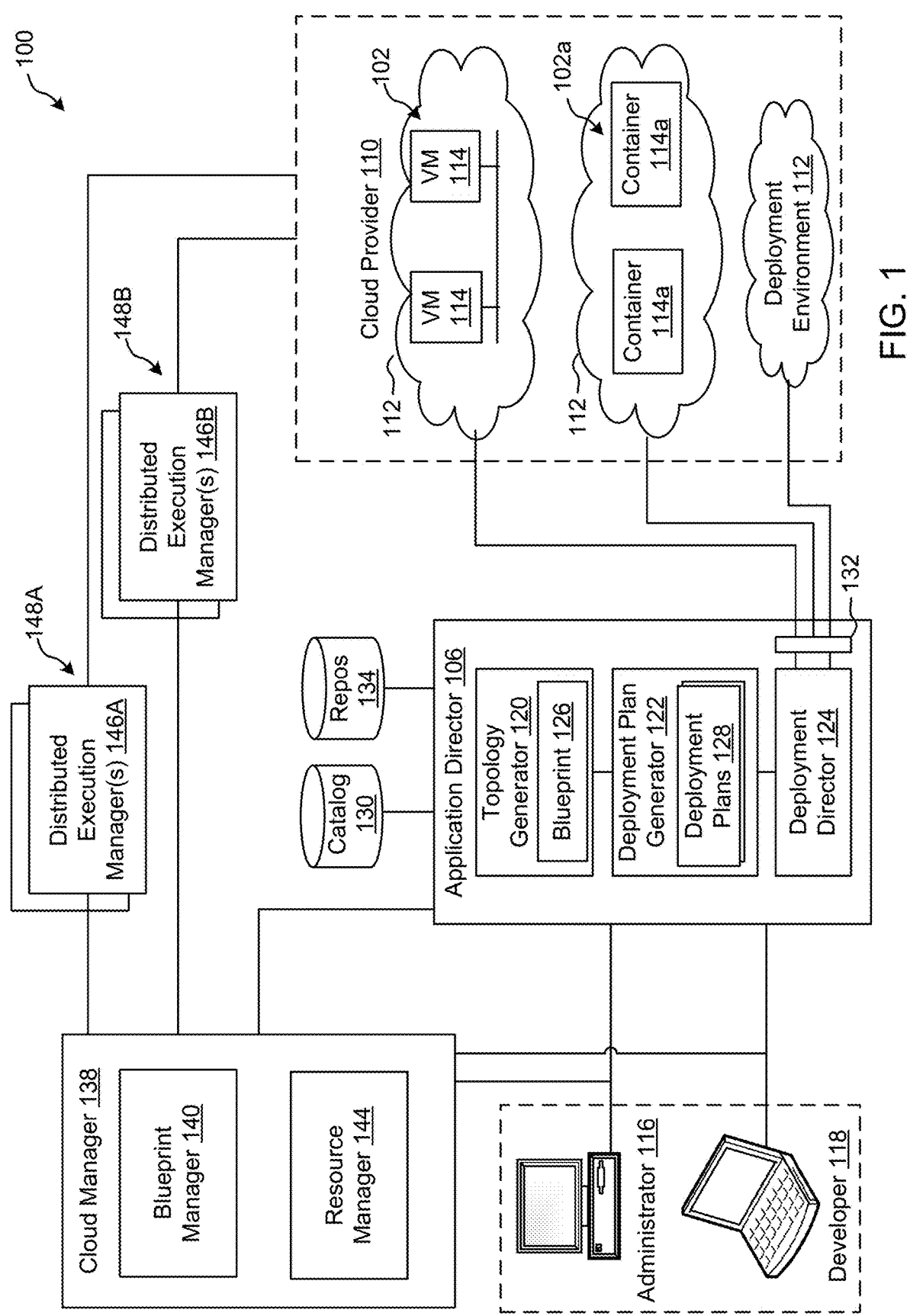
FIG. 1 depicts an example system constructed in accordance with the teachings of this disclosure for managing a cloud computing platform.

Virtualization technologies can be used for computing, storage, and/or networking, for example. Using virtualization, hardware computing resources and/or other physical resources can be replicated in software. One or more application programming interfaces (APIs) can be implemented to provide access to virtualized resources for users, applications, and/or systems while limiting or masking underlying software and/or hardware structure.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, which is hereby incorporated herein by reference in its entirety.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

In certain examples, a VM can host a container and/or a container can be implemented for virtualization in place of the VM. Containers (e.g., Docker®, Rocket™ Linux® containers (LXC), etc.) can be used in computing environments to run applications, programs, utilities, and/or any other software in isolation. Containers can be used to achieve improved resource management (e.g., resources used by containerized components are isolated for use only by those components that are part of the same container) and/or for security purposes (e.g., restricting access to containerized files or components). In addition, containers can also be used to achieve lightweight, reproducible application deployment. While a container is intended to run as a well-isolated instance of software in a host environment, the security properties of a container image and/or a container can impact operations of other resources and/or processes in a host computer environment in which the container executes.

Prior to running as a container in the host environment, the container is defined in a container image that specifies components such as an application along with any libraries, binaries and/or other files to execute the container in the host environment (e.g., a VM, etc.). In some examples, the specified components remain unassembled (e.g., they are not located together to form a container) until a time at which the container is to be executed. When a determination is made to execute the container in the host environment, the host environment uses the container image to assemble the previously unassembled parts specified in the container image for execution as a container. In certain examples, a platform as a service (PaaS) environment can host a plurality of containers and virtual applications (vApps).

As disclosed herein, methods and apparatus provide for automation of management tasks such as provisioning multiple virtual machines and/or containers for IaaS and/or other product installation. Virtual appliances, component servers (e.g., Microsoft Windows™ machines, etc.), etc., can be distributed, installed, and managed using virtualization of computing resources including operating system virtualization.

For example, operating system virtualization (also referred to as container virtualization) can facilitate deployment and management of virtual computing resources to provision virtual machines, containers, associated appliances and/or machines, allocate tasks to desired systems to execute those virtual machines or tasks, and/or reclaim cloud computing resources that are no longer in use. The improvements to cloud management systems (e.g., the vCloud Automation Center (vCAC) from VMware®, the vRealize Automation (vRA) Cloud Automation Software from VMware®), interfaces, portals, etc., disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Example Provisioning and Subscription Systems and Methods

Certain examples enable client definition and deployment of architecturally complex virtual computing environments. Such virtual computing environments can include multiple machines, software, etc. While some systems (e.g., vRealize Automation®, etc.) provide functionality to enable common scenarios "out of the box", certain examples enable customization for specific functionality. Certain examples provide a flexible and powerful extensibility mechanism that enables cloud administrators and/or other users, for example, to fine tune a resource provisioning process by blocking, pausing, and/or otherwise (temporarily) halting the provisioning process to enable execution of custom scripts and/or functionality before provisioning continues. In certain examples, the provisioning process can fail if a specified criterion is not met.

In certain examples, an event broker service (EBS) provides publish-subscribe functionality to allow other services to subscribe to messages regarding system process events (e.g., provisioning, etc.) and receive updates regarding process execution. For example, the EBS uses REST (Representational State Transfer) APIs (Application Programming Interface) and/or other client-server communication protocol for publish-subscribe communication. The event broker REST API provides features for managing subscriptions, event topics, events, and messages, for example.

In certain examples, the EBS allows services to register and manage event topics, publish events, and manage subscriptions by event consumers. Event consumers can register/subscribe to retrieve and/or otherwise receive events according to event topic, etc. Event producers (e.g., services, service providers, etc.) publish events to the EBS, and, after receiving an event, the EBS notifies event consumers that are subscribed to the event.

A blueprint is a specification for a service (e.g., a virtual computing service, etc.). A blueprint specifies components of a service, such as input parameters, submission and read-only forms, sequence of actions, provisioning, etc. Service blueprints can be created to provision custom resources that have previously been created according to certain parameters, for example. The blueprint stores the parameters in association with the resource to enable the resource to be instantiated again. A blueprint, such as a service blueprint, can be published as a catalog item for selection via a catalog of available services for provisioning, for example. When a catalog item is selected, the corresponding resource is provisioned according to the parameters specified in the blueprint, for example.

Certain examples provide a composition blueprint service (CBP) that enables customers (e.g., via a designer) to define their complex multi-machine systems including dependencies between components and software to install on each component. An event broker service (EBS) works with the CBP and provides publish-subscribe functionality for provisioning and/or other system process, in which blocking subscribers are able to process events first, before non-blocking subscribers. By integrating CBP and EBS, clients can extend, modify, and/or otherwise alter flow of a provisioning process. The CBP can construct a dependency tree for virtual computing system components and provision the components in order (or in parallel if no dependency exists between components) as each component transitions among a plurality of lifecycle states including allocation, provisioning, software installation, deallocation, continuing operations, etc. For each lifecycle state, a subscription topic can be defined in the EBS, which enables customers and/or other services to subscribe and listen for events related to the subscribed topic.

In certain examples, when the CBP initializes (e.g., is selected via catalog, started by a service, instantiated in a VM, etc.), the CBP subscribes (e.g., listens, monitors, etc.) to subscription topics corresponding to lifecycle states as a non-blocking subscriber. As a non-blocking subscriber, client processes can accommodate events with priority over the CBP as a non-blocking subscriber, for example.

During provisioning of resource(s) corresponding to a selected blueprint, the CBP sends an event to EBS at each lifecycle stage. A payload of the event includes relevant information about current operation, deployment parameters, status, etc. Interested clients can subscribe to one or more topics, either as a blocking or non-blocking subscriber. A blocking subscription allows the subscribing client service to process the event before the CBP resumes provisioning the resource(s). For example, an event payload can include one or more special fields that can be modified by blocking clients and can then be propagated to subsequent subscribers. The CBP interprets those fields to alter the provisioning process, for example. The CBP may trigger a failure, make a detour, and/or update data (e.g., a number of processors of a machine, etc.). While a blocking subscription pauses other subscriber activity, a non-blocking subscription allows other events to continue executing in conjunction with the event subscription topic.

In certain examples, when all interested clients have had an opportunity to process and/or otherwise interact with events, the CBP receives the event (e.g., based on its subscription to the event topic as a non-blocking subscriber)

and resumes the resource provisioning, advancing to a next state of the lifecycle. Thus, the CBP can start a provisioning operation and send an event. The EBS then facilitates one or more blocking subscribers who may modify the event. After the blocking subscriber(s) have completed their modification, the CBP receives the event and resumes the provisioning operation, for example.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
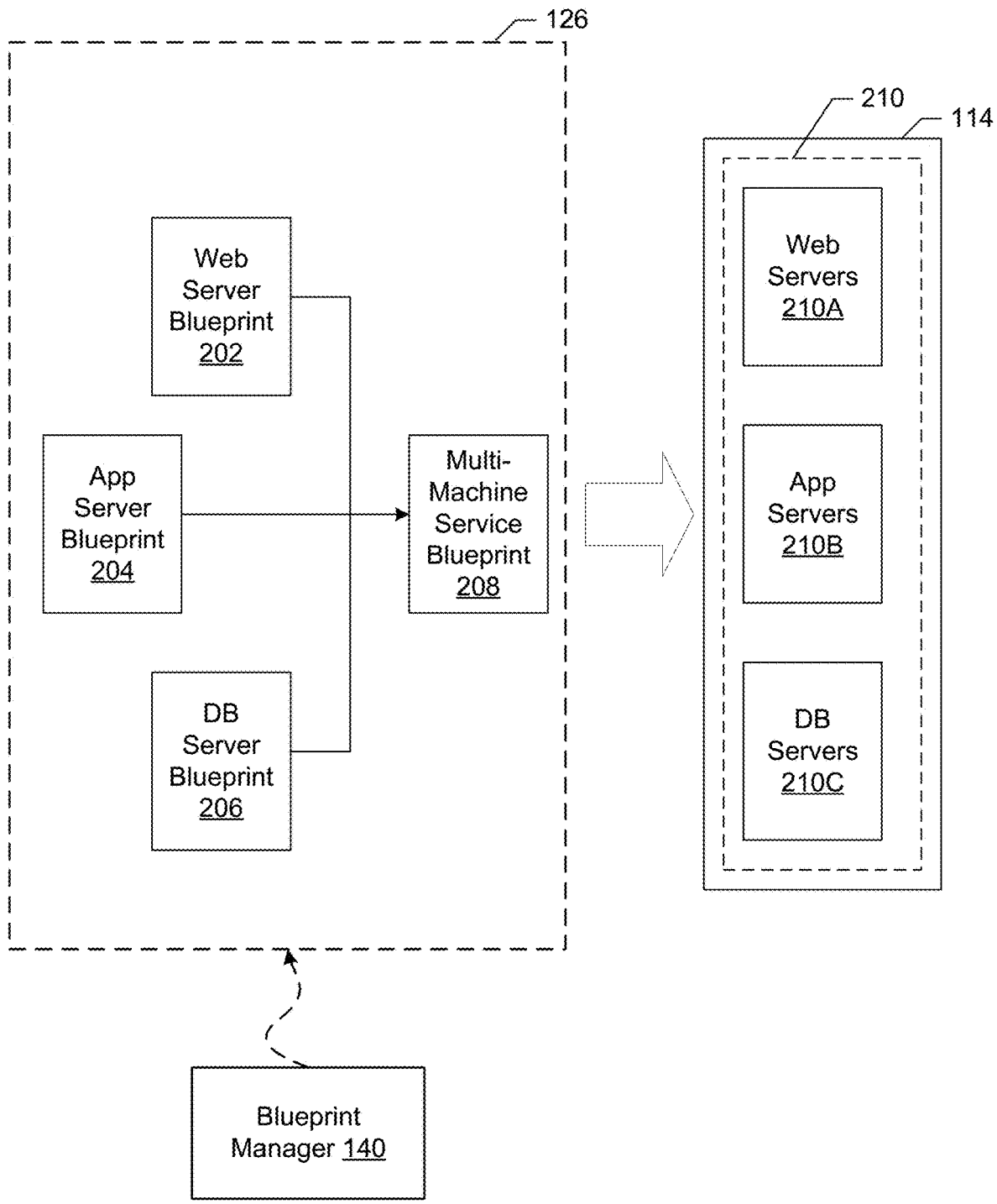
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service 210 formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premises virtual machines, and some may be virtual machines at a cloud service.

Several multi-machine blueprints 208 may be generated to provide one or more varied or customized services. For example, if virtual machines deployed in the various States of the United States require different settings, a multi-machine blueprint 208 could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints 208 reducing the amount of storage space for storing disk images compared with storing a disk image for each customized setting.

Figure 3:
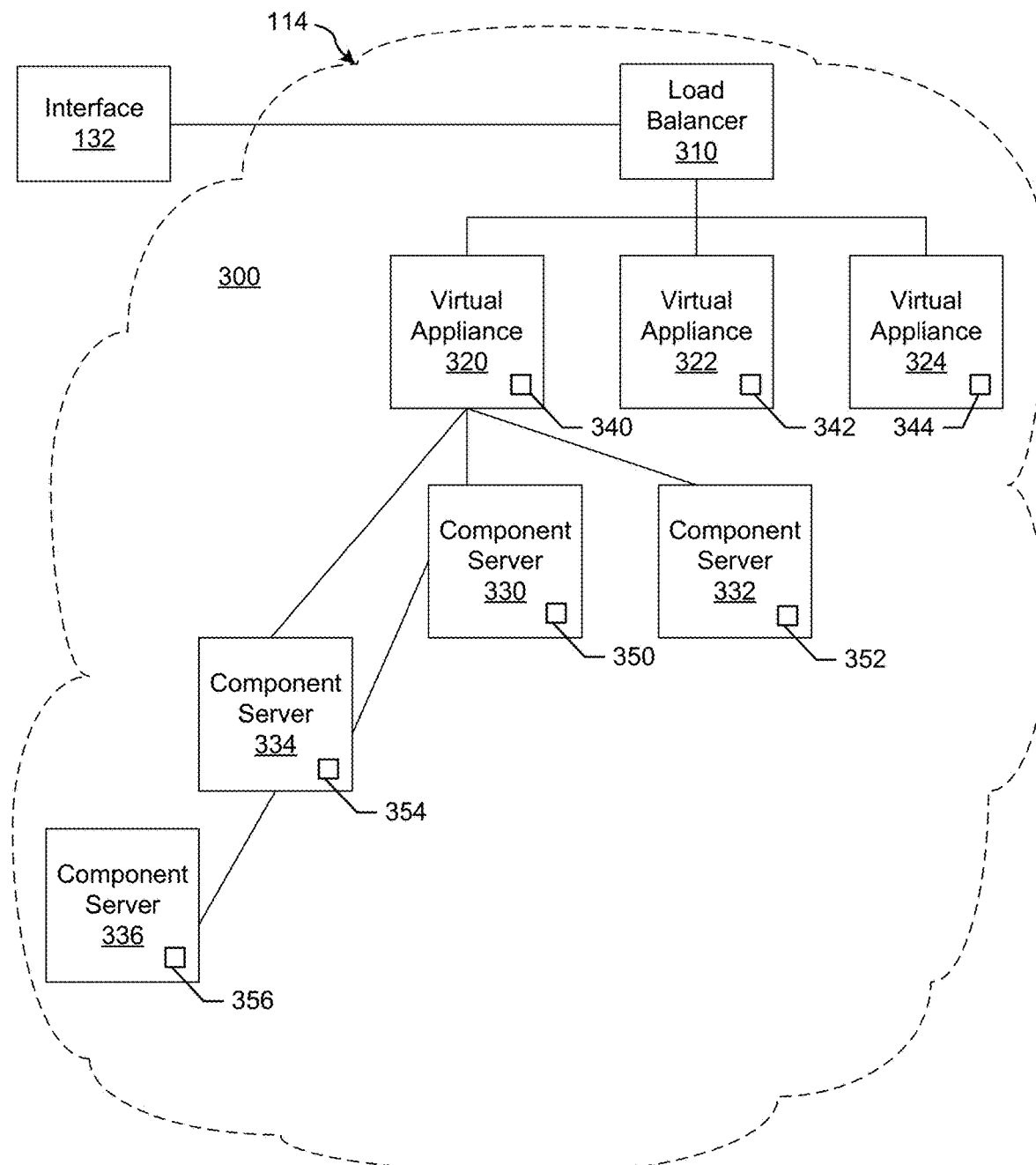
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premises automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
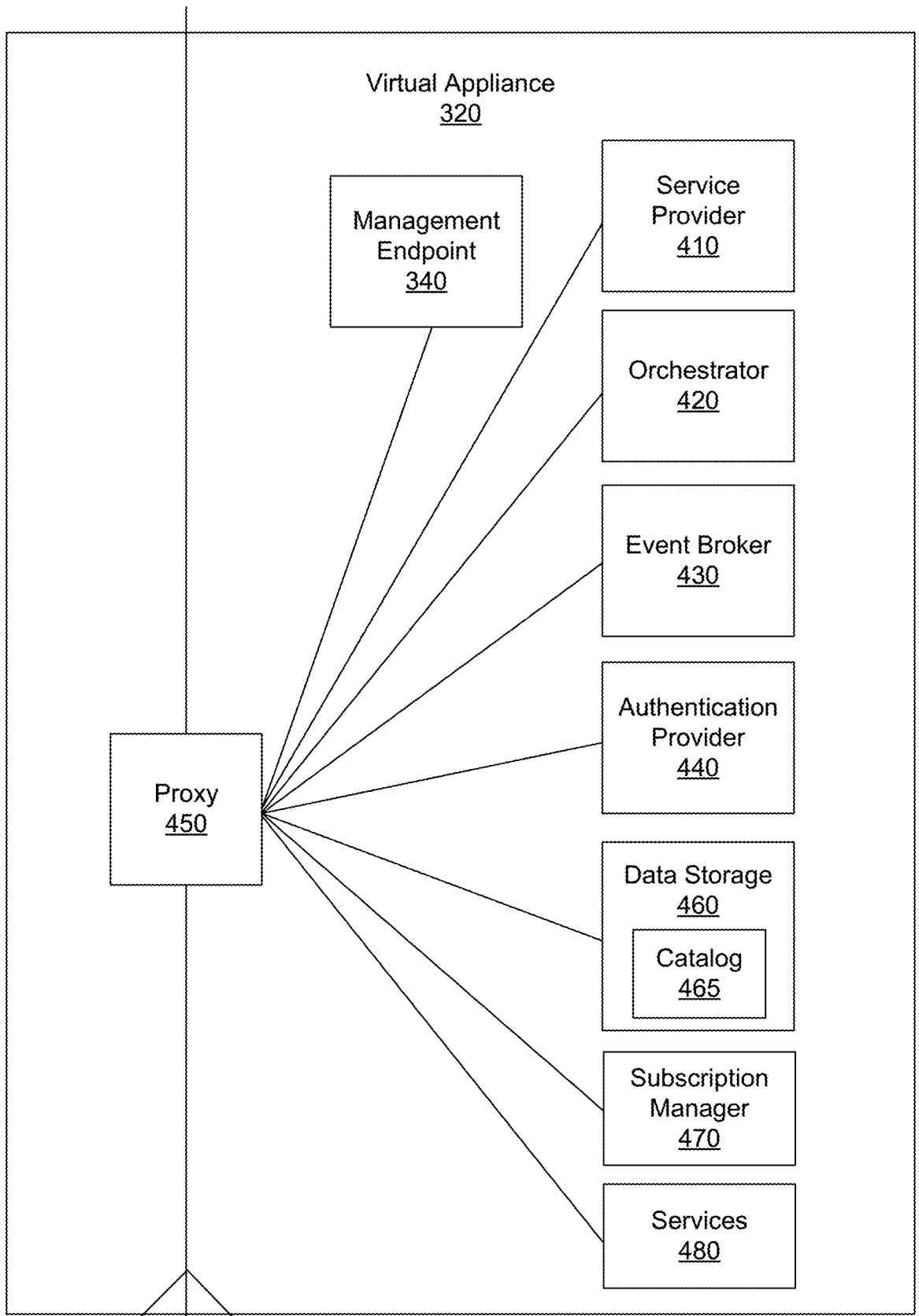
FIG. 4 illustrates an example implementation of a virtual appliance including subscription and provisioning functionality in accordance with the present disclosure.

FIG. 4 illustrates an example implementation of the vA 320. In the example of FIG. 4, the vA 320 includes an example service provisioner 410, an example orchestrator 420, an example event broker 430, an example authentication provider 440, an example internal reverse proxy 450, an example data storage 460, an example catalog 465, an example subscription manager 470, and example services 480. The components 410, 420, 430, 440, 450, 460, 470, 480 of the vA 320 can be implemented by one or more of the VMs 114 and/or containers 114a, for example. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision services but is embedded in the vA 320. For example, the orchestrator 420 can be used to invoke a blueprint to provision a manager for services. In some examples, the orchestrator 420 includes a library of workflows that can be selected for execution.

Example services 480 can include catalog services, identity services, component registry services, approval services, resource management services, event broker services, IaaS, XaaS ("Anything-as-a-Service"), etc. Catalog services provide a user interface via which a user can request provisioning of different preset environments (e.g., a VM 114 including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The approval services provide a method by which a request to provision a virtual machine (or service) can be approved by a system administrator(s). The resource management services can control the leasing, expiration and reclamation of managed resources. The event broker 430 provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between the services 190 and the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

In the example vA 320 of FIG. 4, the example services 480, the example event broker 430, the example subscription manager 470, and the example orchestrator 420 implement an example workflow subscription service to enable services and/or other clients to subscribe to provisioning workflow events. Using the subscription service, provisioning workflows can be extended to include additional tasks. The example workflow subscription service implemented by the vA 320 enables a customer, such as the tenant administrator 116, or any other authorized user, service, machine, etc., to control when provisioning workflows (or workflow related to provisioning activities) are performed based on events reported by service(s) 480 to the event broker 430. In some examples, the workflow subscription service further allows the tenant administrator 116 and/or other client to control when workflows are performed based on events coupled with user-specified and/or other process-specified conditions.

As used herein, an event topic describes a set of events having a same logical intent and a same structure. Each event is an instance of an event topic. Further an event topic is a type of event message that is sent to the event broker 430 by one or more of the services 480. An event can indicate a change in the state of one of the services 480 that produces the event (or any of the entities managed by any such one of the services 480), for example. An event is an informational element (or data structure) in which information about an event occurrence is recorded. An event notification or message transports information about the event between the various services 480 and the event broker 430 and between the event broker 430 and the subscription manager 470.

In some examples, event topics include a post approval event topic, a pre-approval event topic, an event log default event topic, a blueprint configuration event topic, a resource reclamation event topic, a business group configuration event topic, an orchestration server configuration event topic, a machine lifecycle event topic, a machine provisioning event topic, etc. The post approval and pre-approval event topics are associated with the approval service and can be used to trigger workflows associated with obtaining enterprise approvals for an operation. (For example, if a user would like to provision a new virtual machine, the pre-approval event topic may be used to generate a workflow that will require a set of administrative approvals be obtained before the virtual machine is provisioned.) The event log default event topic represents the addition of an entry in an event log and can be generated by an event log service. The event log can be a recordation of any of a set of occurrences/operations performed by any of the components of the vA 320. The blueprint configuration event topic can be associated with the creation, deletion or updating of a blueprint configuration and can be generated by a composition service. The resource reclamation completion event can represent a resource lease expiring and reclamation of the resource subject to the expired lease. The resource reclamation completion event can be generated by a resource management service. The business group configuration event topic can represent a business group being created, updated or deleted and can be generated by an identity service. The orchestration server configuration (XaaS) event topic can represent an orchestrator server configuration being created, updated, deleted or modified and can be generated by an advanced-designer service. The machine lifecycle event topic can represent an IaaS action being run on a provisioned machine and can be generated by an IaaS service. The machine provisioning event topic can represent an IaaS machine in the process of being provisioned and can be generated by an IaaS service.

Each event topic has an associated event schema. In some examples, when creating a workflow script to be executed in connection with a subscription, the workflow script can be configured to include input parameters (or a single input parameter) that use/consume all (or some) of the data included in the data fields of the event payload/schema. The name and type of such input parameters are defined to match the name and type specified in the event schema, for example. In some such examples, the subscription manager 470 extracts the event schema from the event message and supplies the extracted event schema as input parameters to the orchestrator 420 for use in executing the custom workflow script. In addition, the workflow script can be configured to generate output parameters that match a desired schema. Thus, the generated output parameters that result from executing the custom workflow script are supplied by the orchestrator 420 to the subscription manager 470 after the workflow script is executed and the subscription manager 470 includes the output parameters in a reply message transmitted back to the event broker 430 for subsequent usage by other workflow subscriptions and/or for use by the service that produced the event that triggered the workflow. In addition to input parameters, the subscription manager 470 supplies a workflow identifier and any other information needed by the orchestrator 420 to execute the workflow script.

For event topic subscribers, an event notification/message includes an event payload that identifies the event topic associated with the event notification (e.g. the event of interest) and includes event schema information. In some examples, upon receiving the event schema information, the subscription manager 470 processes the event schema information to identify an event of interest. Workflow information associated with the event is also sent to the orchestrator 420, which uses an associated workflow identifier (and, if appropriate, input parameters) to execute the workflow 420. In some examples, the workflow identifier indicates that a specialized workflow is to be executed. The specialized workflow can be a workflow containing tasks and/or steps embodied in and/or corresponding to an executable script that the tenant administrator entered at the tenant administrator work station 116 (see FIG. 1), for example. When this occurs, a storage address of the data storage 460 at which the script is stored can be transmitted to the workflow orchestrator 420. In some such examples, the workflow orchestrator 420 responds by executing the tasks/steps contained at the storage address of the data storage 460. In some examples, upon completion of the workflow, the workflow orchestrator 420 can notify the subscription manager 470. The subscription manager 470 can respond to the notification by notifying the event broker 430. In some examples, the notification transmitted to the event broker 430 can include information about any aspect of the subscription and/or about execution of the workflow, etc.

By way of example, Table 1 illustrates an example provisioning event topic schema. In this example, the provisioning event topic schema is related to the provisioning of a virtual machine. In the illustrated example, the machine is identified using an identifier, "id," a machine name, a machine identifier on the hypervisor, a machine owner, and a machine type. As illustrated, the machine can be a physical machine or a virtual machine and includes a set of properties. The machine properties can include a blueprint name, a component identifier, a component type identifier, an endpoint identifier, a request identifier and a lifecycle state that indicates a state, phase and event. In addition, the event schema includes a virtual machine event field, a workflow next state field, a virtual machine add or update properties field and a virtual machine delete properties field.

TABLE 1

Example Provisioning Event Topic Schema

```
{
  machine : {
    id                  : STRING,    /* IaaS machine ID */
    name                : STRING,    /* machine name */
    externalReference   : STRING,    /* machine ID on the hypervisor */
    owner               : STRING,    /* machine owner */
    type                : INTEGER,   /* machine type: 0 - virtual machine; 1 - physical machine; 2 - cloud machine */
    properties          : Properties /* machine properties, see notes below how to expose virtual machine properties */
  },
  blueprintName         : STRING,    /* blueprint name */
  componentId           : STRING,    /* component id */
  componentTypeId       : STRING,    /* component type id */
  endpointId            : STRING,    /* endpoint id */
  requestId             : STRING,    /* request id */
  lifecycleState        : {
                                     /* see Life Cycle State Definitions*/
    state : STRING,
    phase : STRING,
    event : STRING
  },
  virtualMachineEvent                 : STRING,     /* fire an event on that machine - only processed by Manager
                                                      Service as cosumer */
  workflowNextState                   : STRING,     /* force the workflow to a specific state - only processed by
                                                      Manager Service as consumer */
  virtualMachineAddOrUpdateProperties : Properties, /* properties on the machine to add/update - only processed by
                                                      Manager Service as consumer */
  virtualMachineDeleteProperties      : Properties  /* properties to remove from the machine - only processed by
                                                      Manager Service as consumer */
}
```

Based on the foregoing description, the example workflow subscription service implemented by the example vA 320 provides features that permit workflows to be triggered/executed based on a combination of events and user-selected/user-specified/machine-generated conditions. The workflow subscription system disclosed herein enables the triggering of additional workflow/workflow tasks by making selections (e.g., via a graphical user interface, program instructions, etc.). Further, the triggering of the workflow can be made contingent upon any number of conditions.

Figure 5:
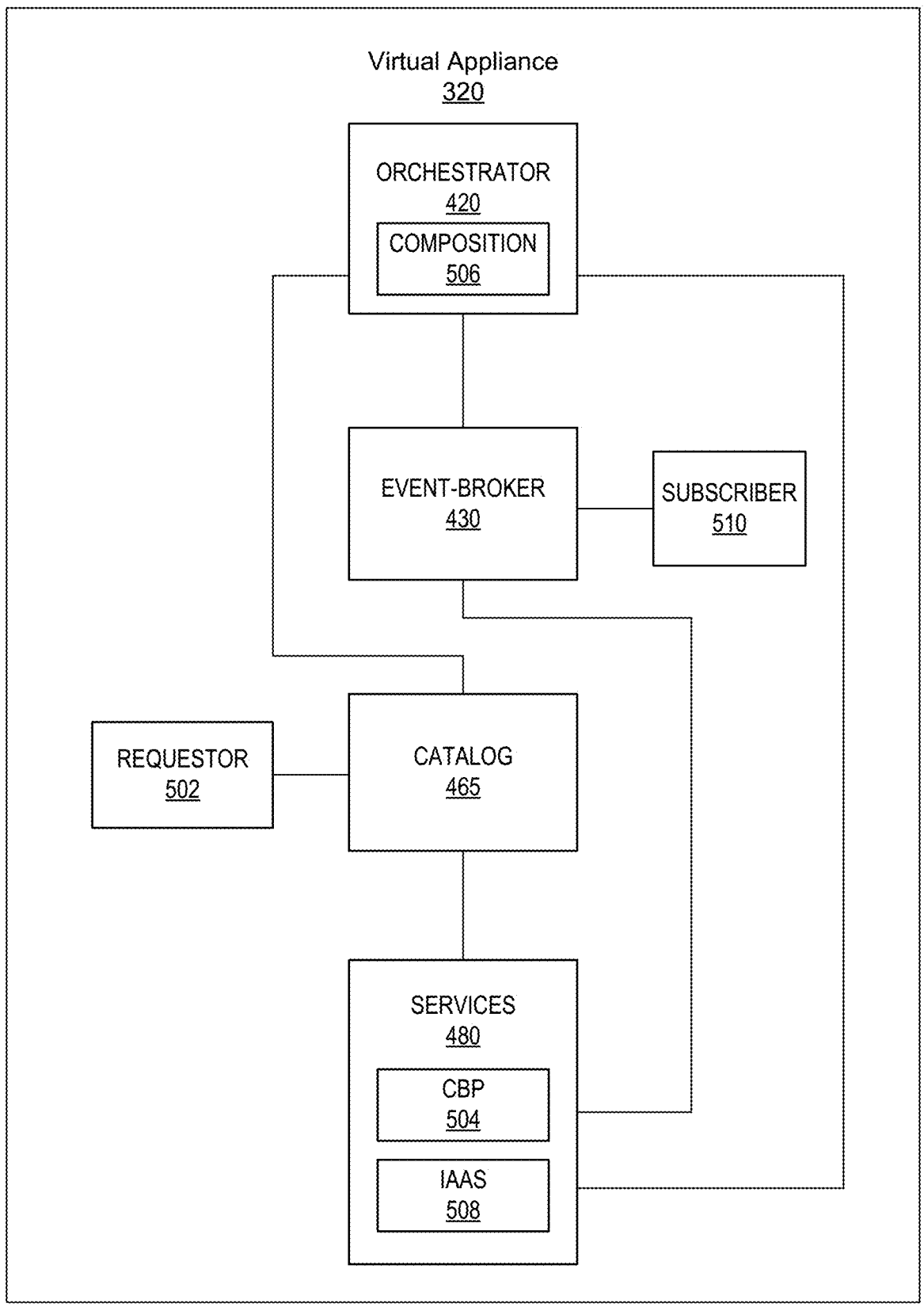
FIG. 5 illustrates an example implementation of a virtual appliance to process an example blueprint and manage associated subscription(s) according to subscription type, etc.

FIG. 5 illustrates an example implementation of the vA 320 to process an example blueprint 126 and manage associated subscription(s) according to subscription type, etc. As shown in the example of FIG. 5, a requester 502 requests the blueprint 126 from the catalog 465. The blueprint 126 can include a complex multi-machine service blueprint 208, for example, to define a complex multi-machine system 210 including a plurality of components 210A-210C and software and dependencies between components and software, for example. A complex blueprint service (CBP) 504 works with the catalog 465 and the orchestrator 420 to provision the blueprint 126, 208. The orchestrator 420 implements a composition 506 to provision a service 480 according to the blueprint 126, 208. For example, an IaaS 508 can be a service 480 provisioned by the composition 506 according to the blueprint 126, 208.

The event broker 430 works with the CBP 504 and the composition 506 to provide publish-subscribe functionality for provisioning of the composition 506 and/or other system process, in which blocking subscribers are able to process events first, before non-blocking subscribers. The CBP works with the event broker 430 to enable the requester 502 to extend, modify, and/or otherwise alter flow of a provisioning process. For example, the CBP 504 can construct a dependency tree for virtual computing system components and enable the blueprint 126, 208 for the composition 506 to provision the components in order (or in parallel if no dependency exists between components) as each component transitions among a plurality of lifecycle states including allocation, provisioning, software installation, deallocation, continuing operations, etc. For each lifecycle state, a subscription topic can be defined in the event broker 430, which works with the composition 506 to enable a subscriber 510 (e.g., a client, other service, user, etc.) to subscribe and listen for events related to the subscription topic.

In certain examples, when the CBP 504 initializes (e.g., is selected via the catalog 465, started by another service 480, instantiated in a VM 114, etc.), the CBP 504 subscribes (e.g., listens, monitors, etc.) to subscription topics corresponding to lifecycle states as a non-blocking subscriber. As a non-blocking subscriber, client processes can accommodate events with priority over the CBP 504, for example. If the requestor 502, for example, is a blocking subscriber, then the requestor 502 can block the CBP 504 and/or other subscriber 510 until their process has finished, for example.

During provisioning of resource(s) corresponding to a selected blueprint, the composition 506 sends an event to the event broker 430 at each lifecycle stage. A payload of the event includes relevant information about current operation, deployment parameters, status, etc. Interested clients/subscribers 510 can subscribe to one or more topics, either as a blocking or non-blocking subscriber. A blocking subscription allows the subscribing client service to process the event before provisioning of affected resource(s) resumes. For example, an event payload can include one or more special fields that can be modified by blocking clients and can then be propagated to subsequent subscribers. The orchestrator 420 and its composition 506 interpret those fields to alter the provisioning process, for example. The orchestrator 420, working alone or with the CBP 504, can trigger a failure, make a detour, and/or update data (e.g., a number of processors of a machine, etc.) in response to non-blocking subscribers trying to affect a blocking subscriber event. While a blocking subscription pauses other subscriber activity, a non-blocking subscription allows other events to continue executing in conjunction with the event subscription topic.

In certain examples, when all interested, blocking clients have had an opportunity to process and/or otherwise interact with events, the composition 506 resumes the resource provisioning of the IaaS 508, advancing to a next state of the lifecycle. Thus, the CBP 504 can start a provisioning operation with the composition 506 of the orchestrator 420 and send an event. The event broker 430 then facilitates one or more blocking subscribers 510 who may modify the event. After the blocking subscriber(s) 510 have completed their modification, the composition 506 receives the event and resumes the provisioning operation, for example.

Figure 6:
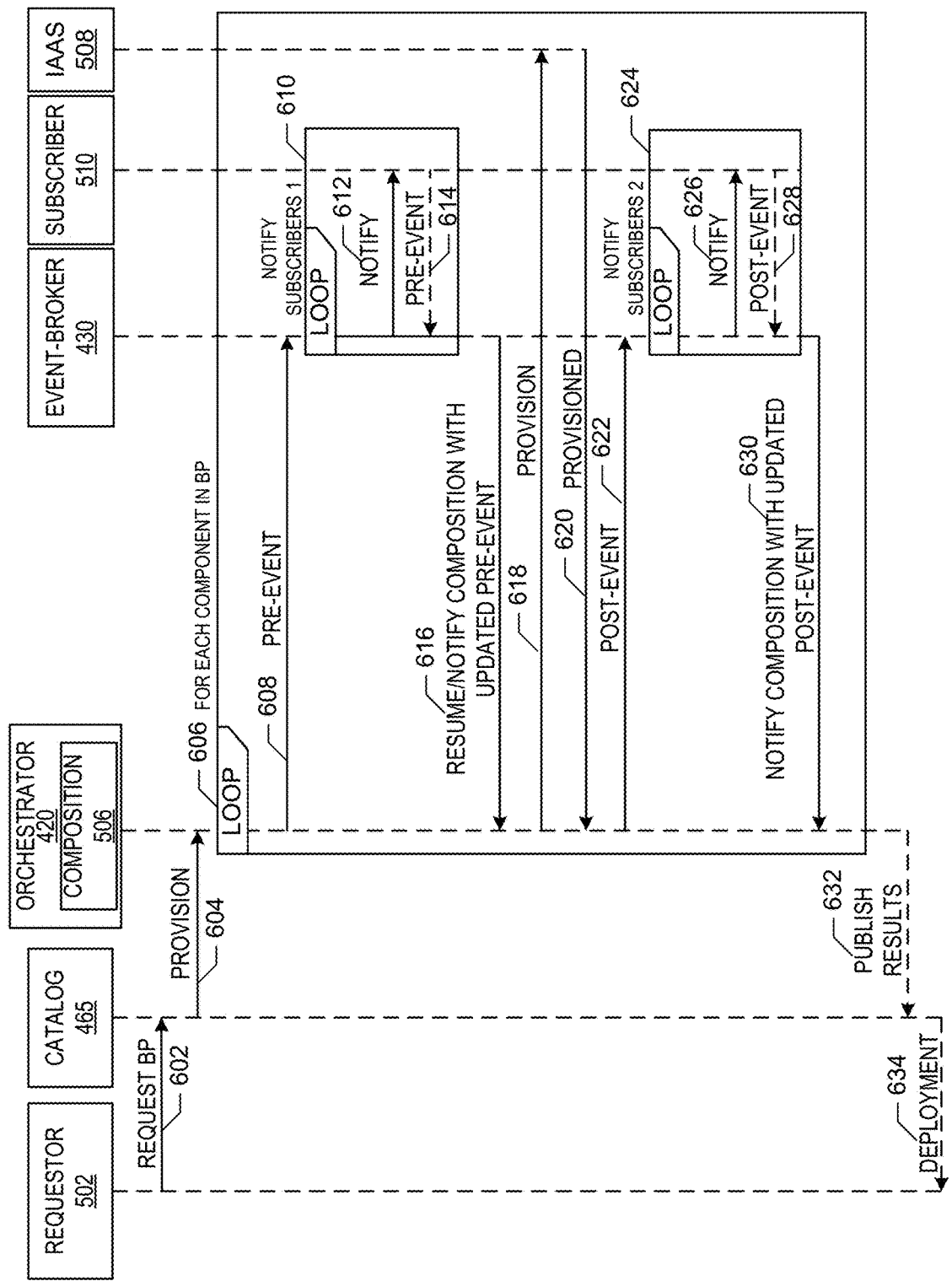
FIG. 6 illustrates an example data flow between a requester, a catalog, a composition of resources, an event broker, a subscriber, and an IaaS of FIG. 5.

FIG. 6 depicts an example data flow diagram 600 between the requester 502, the catalog 465, the composition of resources 506, the event broker 430, the subscriber 510, and the IaaS 508. At 602, the requester 502 requests a blueprint 126 from the catalog 465. For example, the requester 502 selects the multi-machine blueprint 208 from a list of available blueprints in the catalog 465 (e.g., clicks on, highlights, and/or otherwise selects an icon, tile, title, etc., corresponding to the blueprint 208 in the catalog 465). Based on selection of the blueprint 126 from the catalog 465, at 604, the composition 506 is provisioned. For example, the IaaS 508 can be instantiated as a plurality of virtual computing resources. Each resource is to be composed, provisioned, and deployed for use. The composition 506 drives the provisioning process with the event broker 430 and subscriber 510 to provision the IaaS 508 according to the blueprint 126.

At 606, a first loop begins for each component (e.g., virtual computing resource, etc.) defined in the blueprint 126 formed as an event (e.g., a provisioning event, etc.). For example, the blueprint 208 defines a plurality of resources, and each resource is to be instantiated using the IaaS 508. At 608, a pre-event occurs. For example, the event broker 430 is notified by the composition 506 of the initiation of the provisioning of the IaaS 508. The pre-event 608 triggers a second loop 610 notifying subscriber(s) 510 of the provisioning event.

At 610, the subscriber notification loop notifies each subscriber 510 who has subscribed to an event topic associated with this event and/or its pre-event. At 612, a notification message is sent from the event broker 430 to the subscriber 510 including a payload describing the pre-event instruction. The subscriber 510 is then evaluated to determine whether the subscriber 510 is a blocking subscriber or a non-blocking subscriber. If the subscriber 510 is a non-blocking subscriber, then the pre-event continues as-is. However, if the subscriber 510 is a blocking subscriber, then, at 614, the subscriber 510 can modify the pre-event. Thus, a blocking subscriber can modify and/or otherwise affect the pre-event before the pre-event is executed/provisioned as part of the composition 506.

At 616, composition 506 continues with the updated pre-event. Thus, if a blocking subscriber modified the pre-event, the updated pre-event is provided by the event broker 430 to the composition 506. At 618, the composition 506 provisions the IaaS 508, and, at 620, the IaaS 508 acknowledges the provisioning to the composition 506.

At 622, a post-event is generated by the composition 506 and sent to the event broker 430. The receipt of the post-event by the event broker 430 triggers a third loop 624 to notify subscriber(s) 510 of the post-event. At 624, the subscriber notification loop notifies each subscriber 510 who has subscribed to an event topic associated with the post-event. At 626, a notification message is sent from the event broker 430 to the subscriber 510 including a payload describing the post-event instruction. The subscriber 510 is then evaluated to determine whether the subscriber 510 is a blocking subscriber or a non-blocking subscriber. If the subscriber 510 is a non-blocking subscriber, then the post-event continues. However, if the subscriber 510 is a blocking subscriber, then, at 628, the subscriber 510 can modify the post-event. Thus, a blocking subscriber can modify and/or otherwise affect the post-event before the post-event is executed/provisioned as part of the composition 506.

At 630, composition 506 continues with the updated post-event. Thus, if a blocking subscriber modified the post-event, the updated post-event is provided by the event broker 430 to the composition 506. At 632, the composition 506 publishes the provisioning results via the catalog 465. The catalog 465 acknowledges deployment of the service 508 to the requestor 502.

While an example manner of implementing a workflow subscription service in a cloud computing environment is illustrated in FIGS. 1-6, one or more of the elements, processes and/or devices illustrated in FIGS. 1-6 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example subscription manager 470, example services 480, example requestor 502, example composition blueprint service 504, example composition 506, example IaaS 508, example subscriber 510, and/or, more generally, the example system 100 300 of FIGS. 1-6 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example subscription manager 470, example services 480, example requestor 502, example composition blueprint service 504, example composition 506, example IaaS 508, example subscriber 510, and/or, more generally, the example system 100 300 of FIGS. 1-6 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example subscription manager 470, example services 480, example requestor 502, example composition blueprint service 504, example composition 506, example IaaS 508, example subscriber 510, and/or, more generally, the example system 100 300 of FIGS. 1-6 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provisioner 410, example orchestrator 420, example event broker 430, example authentication provider 440, example internal reverse proxy 450, example data storage 460, example catalog 465, example subscription manager 470, example services 480, example requestor 502, example composition blueprint service 504, example composition 506, example IaaS 508, example subscriber 510, and/or, more generally, the example system 100 300 of FIGS. 1-6 may include one or more elements, processes and/or devices in addition to, or instead of, those illustrated in FIGS. 1-6, and/or may include more than one of any or all of the illustrated elements, processes and devices.

Figure 7:
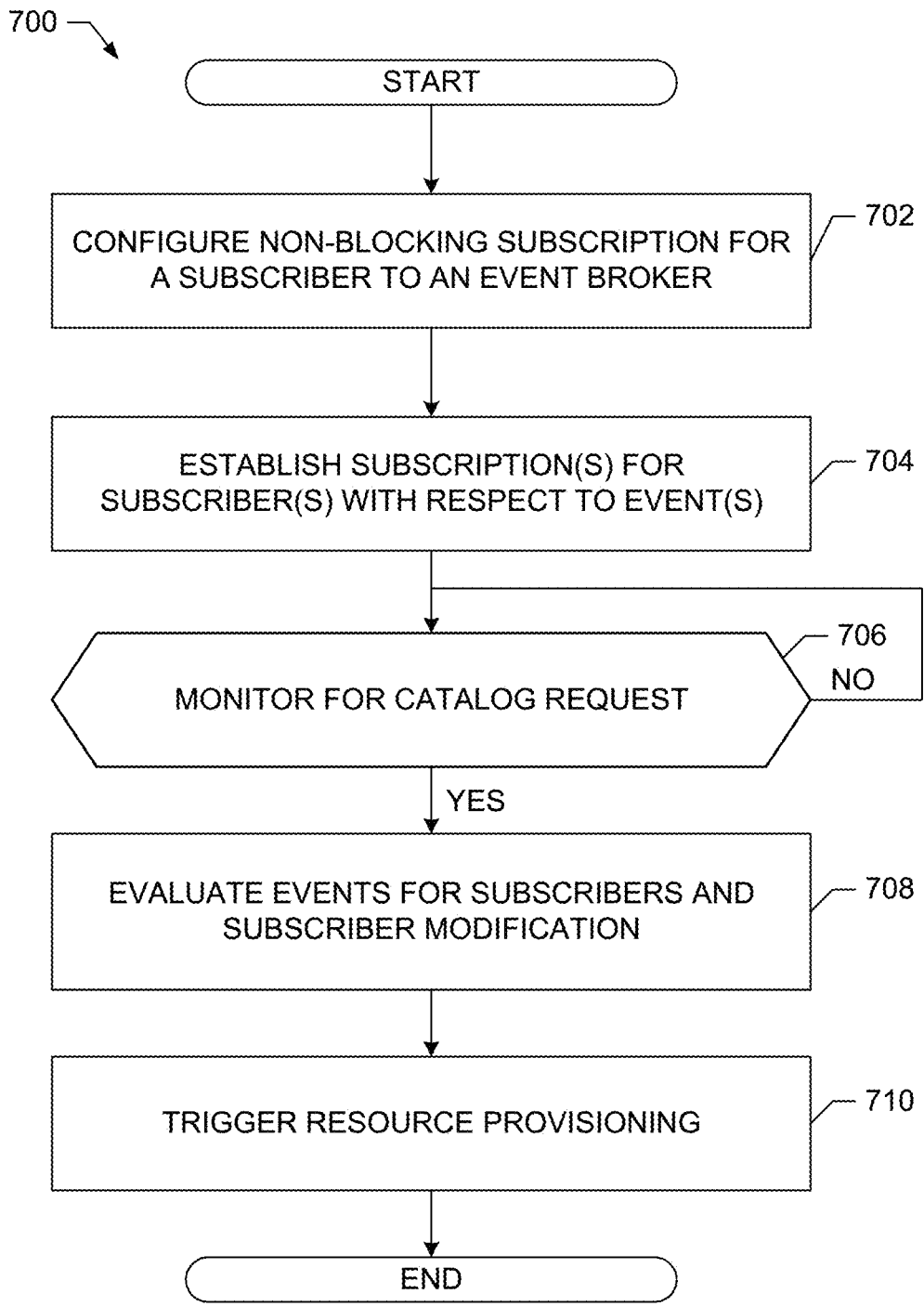
FIG. 7 depicts a flowchart representative of computer readable instructions that may be executed to implement the composition blueprint service and associated provisioning workflow.
Figure 16:
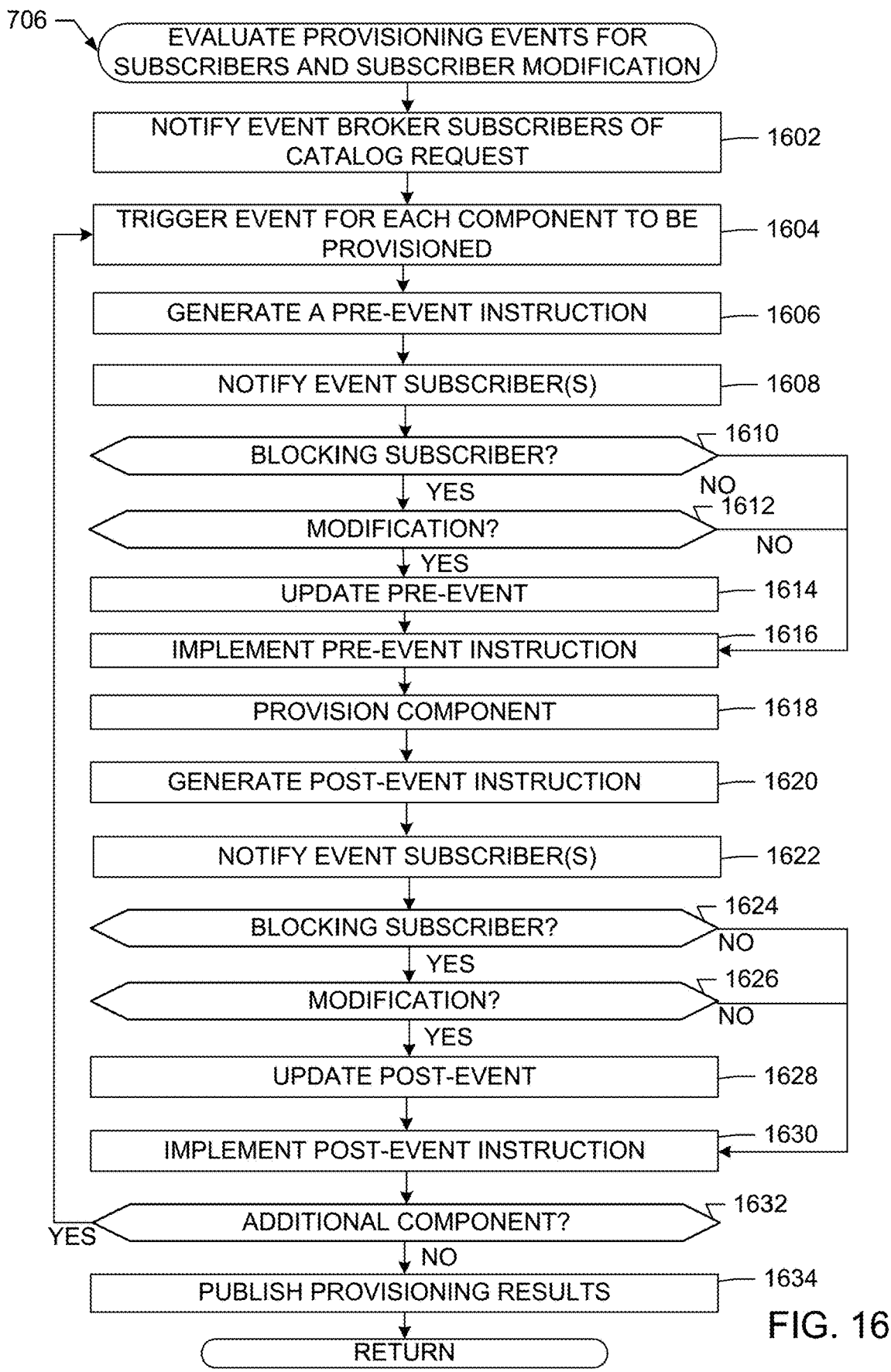
FIG. 16 depicts a flowchart representative of computer readable instructions that may be executed to implement the composition blueprint service and associated provisioning workflow.

Flowcharts representative of example machine readable instructions that may be executed to implement the example virtual appliances 320, example service provisioner 410, example orchestrator 420, example event broker 430, example authentication provider 440, example internal reverse proxy 450, example data storage 460, example catalog 465, example subscription manager 470, example services 480, example requestor 502, example composition blueprint service 504, example composition 506, example IaaS 508, example subscriber 510, and/or to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example system 100 FIGS. 1-6 are shown in FIGS. 7 and 16. In these examples, the machine readable instructions implement programs for execution by a processor such as the processor 1712 shown in the example processor platform 1700 discussed below in connection with FIG. 17. The programs may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example programs are described with reference to the flowcharts illustrated in FIGS. 7 and 16, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 7 and 16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7 and 16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 depicts a flowchart representative of computer readable instructions that may be executed to implement the composition blueprint service and associated provisioning workflow using the example orchestrator 420, the example event broker 430, the example catalog 465, the example services 480, the example CBP 504, the example composition 506, and the example IaaS 508 of the example implementation of the vA 320 of FIG. 5. An example program 700 is illustrated in FIG. 7. Initially, at block 702, a subscription to the event broker 430 is established for one or more subscribers. The subscription to the event broker 430 can be non-blocking, for example. The non-blocking event broker subscription enables each subscriber to receive notification of a catalog request for provisioning of computing resources, for example.

At block 704, one or more subscriptions are established for one or more subscribers with respect to one or more events. For example, once the subscriber(s) have a non-blocking subscription to the event broker 430, one or more subscribers can be subscribed via the subscription manager 470 and the event broker 430 to one or more event topics (e.g., events relating to a catalog request, etc.) relating to provisioning of certain services and/or other virtual computing components (e.g., IaaS services 508 such as cloud director, cloud infrastructure, virtual machine, etc.) according to the blueprint126. Event topics can include blueprint component completed, blueprint component requested, blueprint configuration, business group configuration, catalog item request completed, etc. Each subscriber is identified as a blocking subscriber or a non-blocking subscriber. Blocking versus non-blocking subscriber status can be based on priority, role, permission, type, etc.

Figure 8:
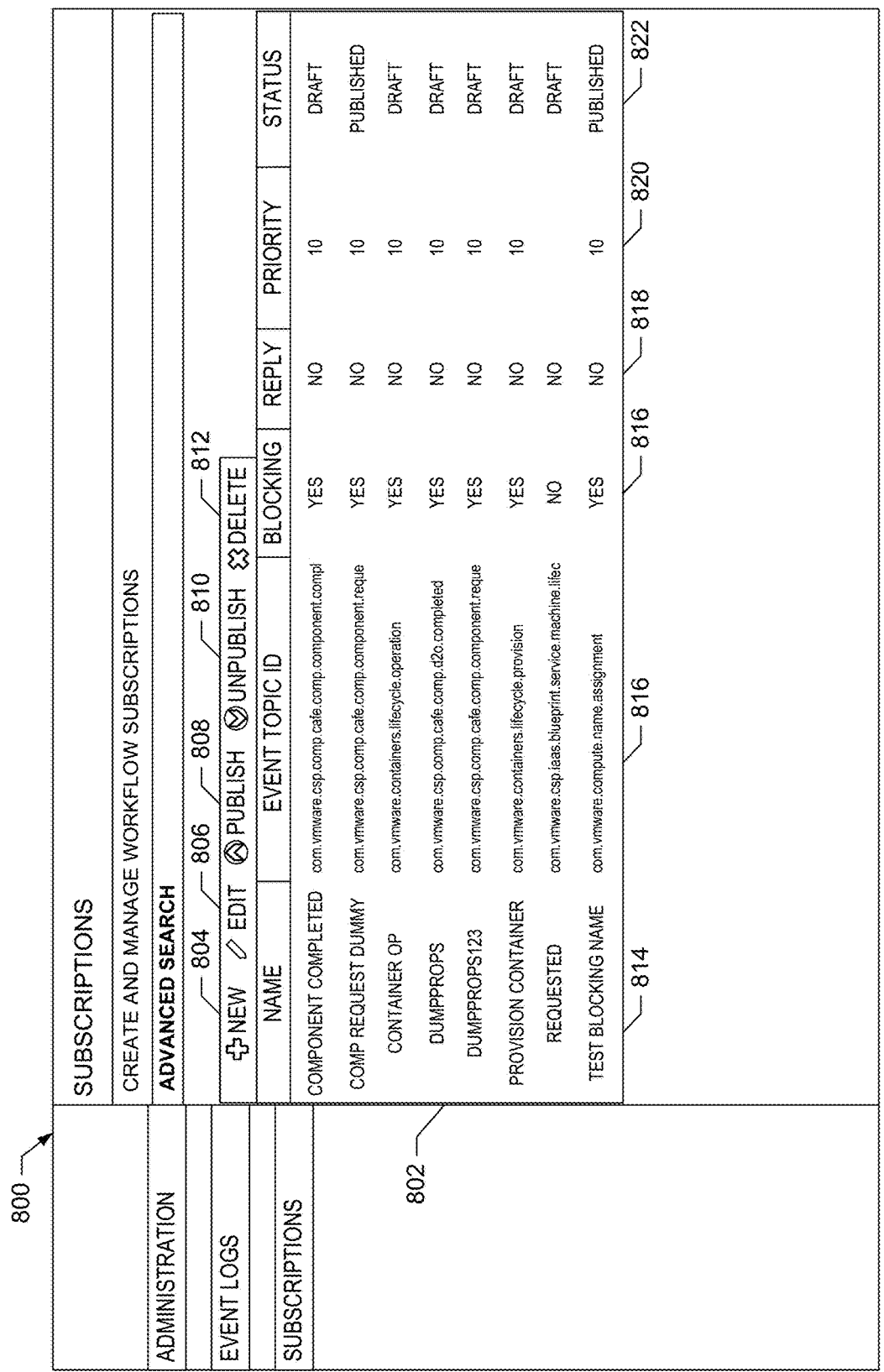

For example, FIGS. 8-12 illustrate example subscription interfaces to facilitate creation and management of workflow subscriptions for the subscriber 510. FIG. 8 illustrates an example subscription interface 800 (e.g., generated and processed by the subscription manager 470, etc.) facilitating creation and management of workflow subscriptions for the subscriber 510. The example interface 800 includes a searchable list 802 of subscriptions, as well as tools to create a new subscription 804, edit an existing subscription 806, publish a subscription 808, unpublish a subscription 810, delete a subscription 812, etc. As shown in the example of FIG. 8, the list 802 of subscriptions includes a subscription name 814, an identification of an event topic 816 associated with the subscription, an indication 818 of whether the subscription is a blocking or non-blocking subscription, an indication 820 of whether a reply is generated for the subscription, a priority level or ranking 822 for the subscription, and a subscription status 824, for example.

FIG. 9 illustrates an example interface 900 to generate a new subscription for the subscriber 510. In addition to naming and describing the subscription and its priority, timeout, etc., the interface 900 allows the user to select whether or not the subscription is to be a blocking 902 subscription, for example.

Figure 11:
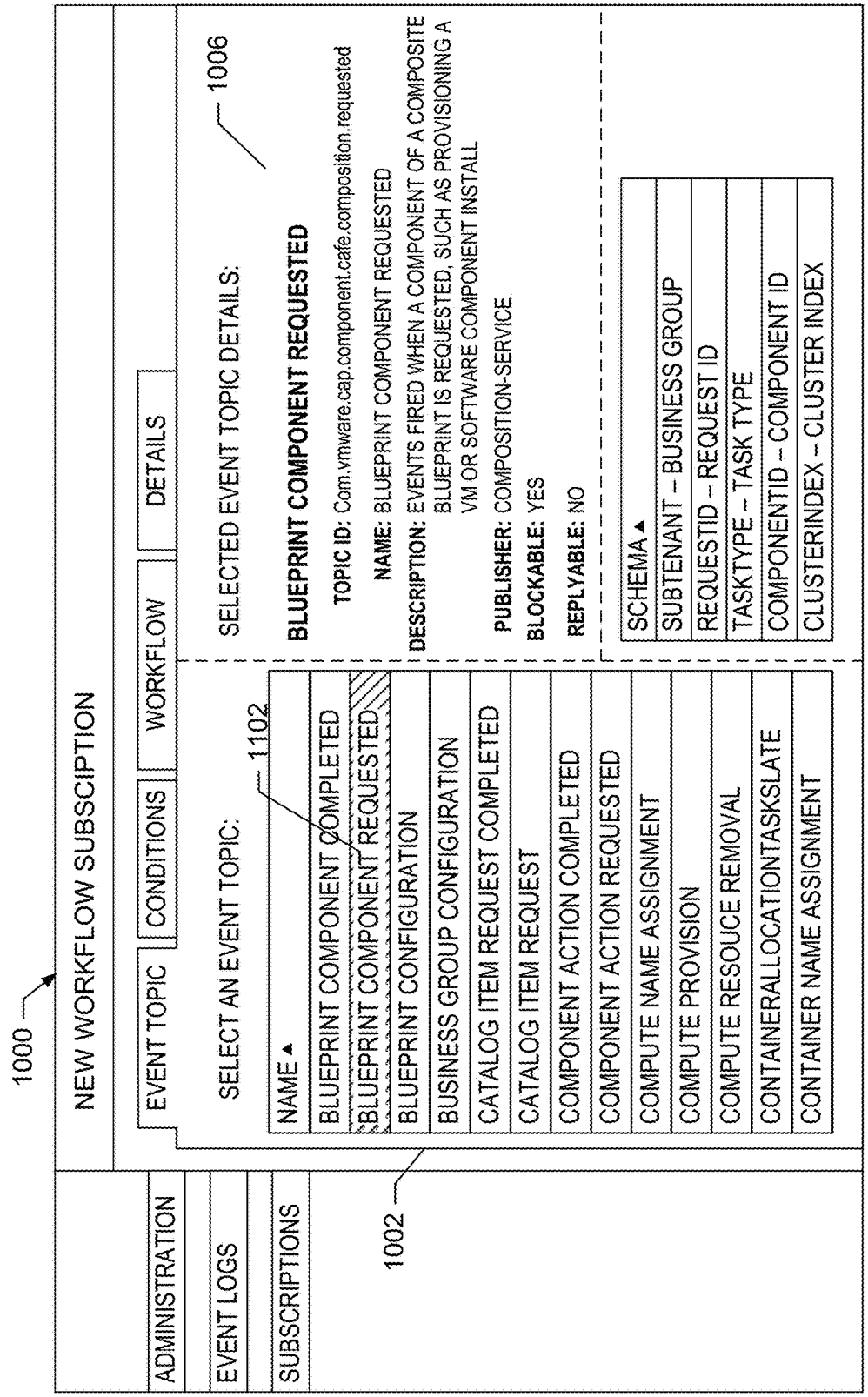

FIGS. 10-11 illustrate example views of an interface 1000 to select an existing subscription to be added for the subscriber. The example interface 1000 includes a list 1002 of available event topics for subscription. As shown in the examples of FIGS. 10 and 11, selecting an event topic 1004, 1102, in the list 1002 provides event topic details 1006 regarding the selected event topic for subscription. Once the subscriber 510 has saved its subscription, then subscription is activated for that subscriber 510.

Figure 12:
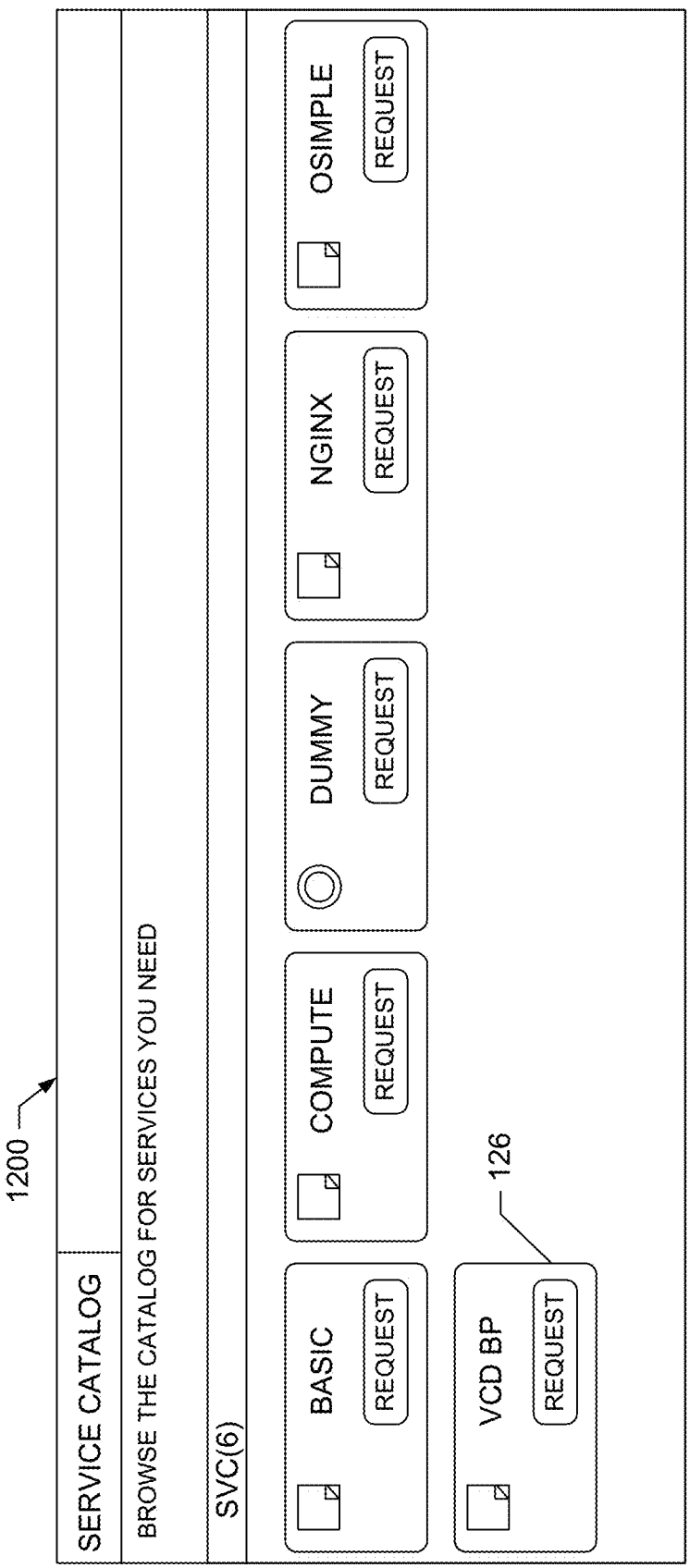
Figure 13:
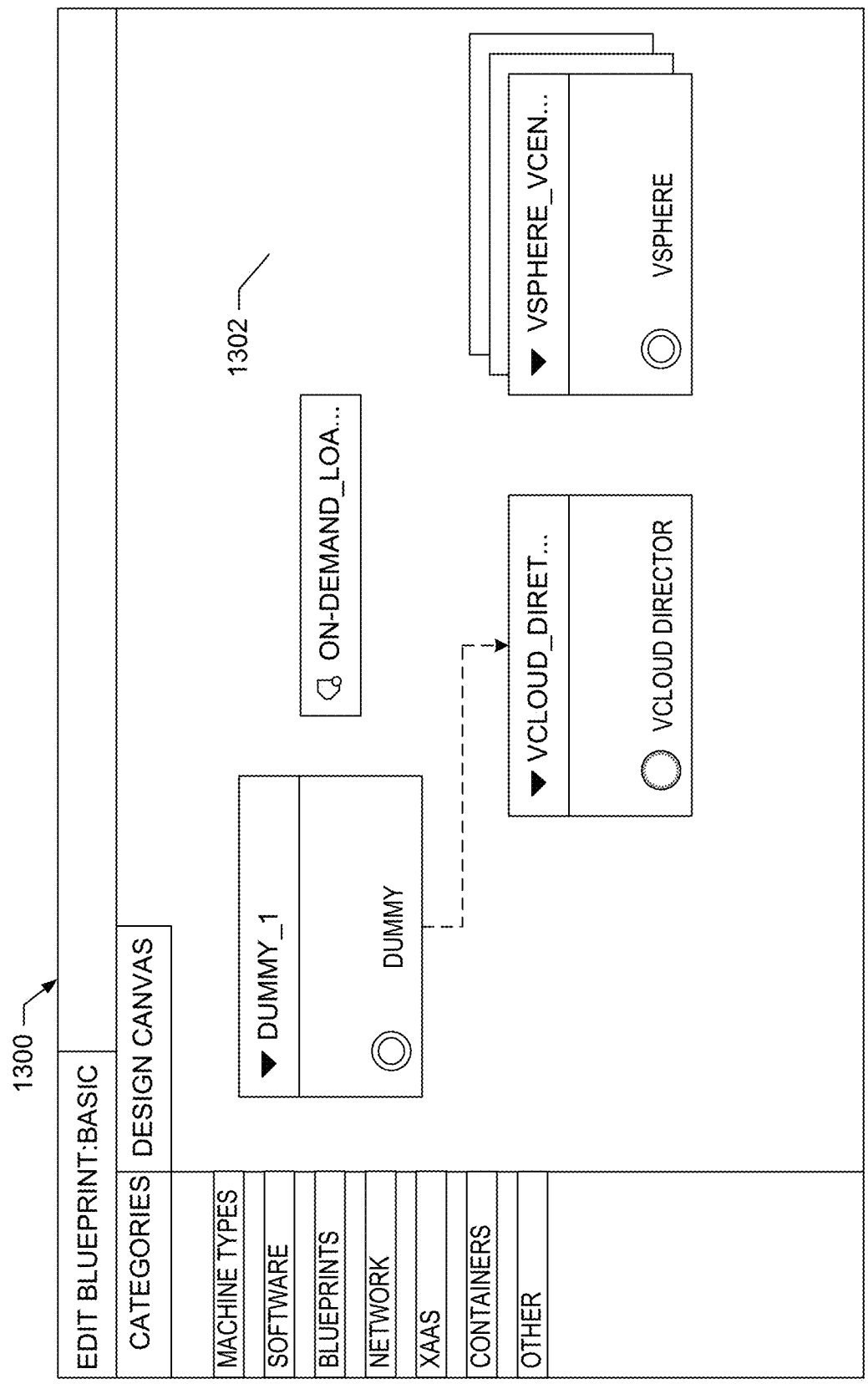
Figure 14:
Figure 15:
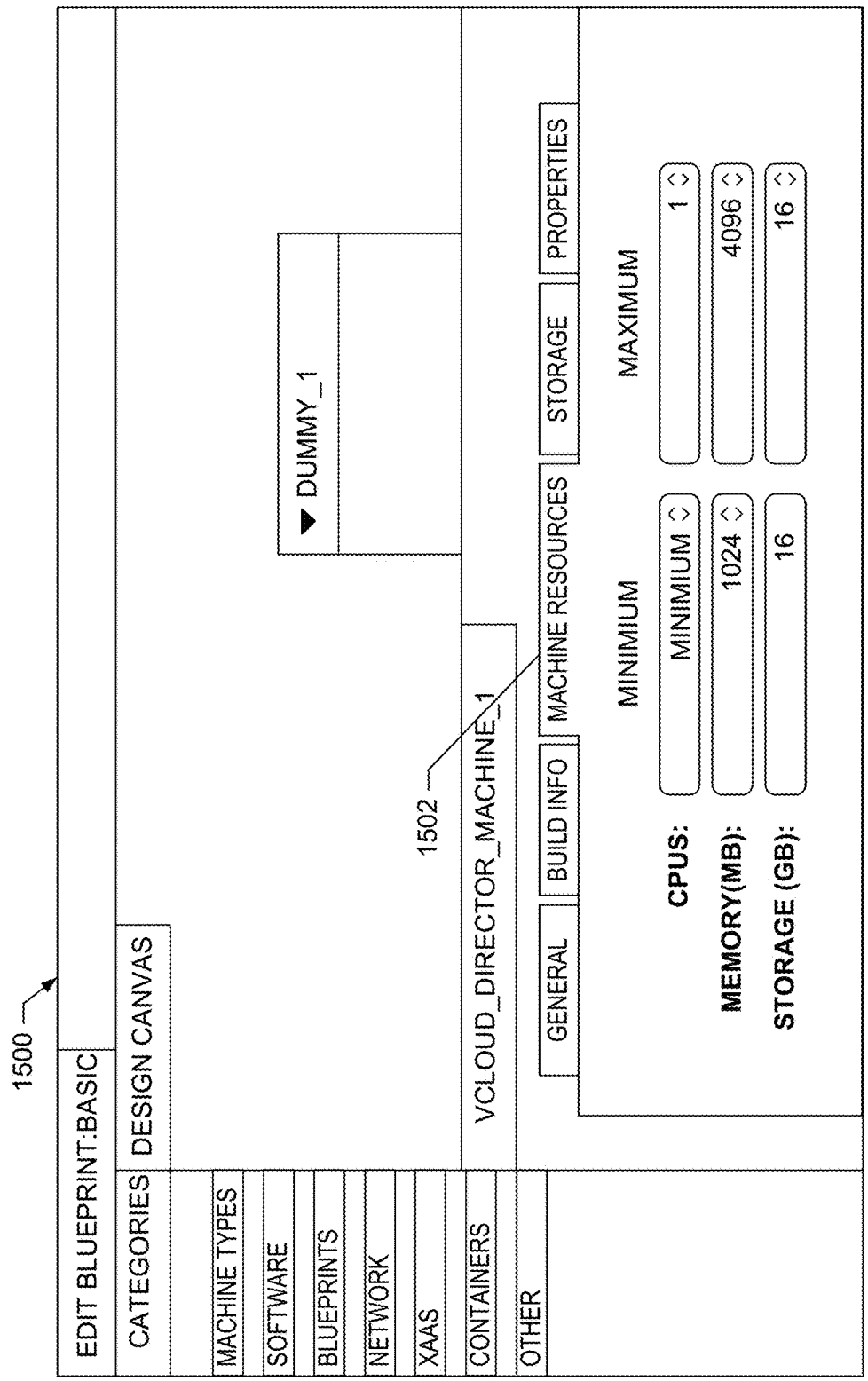

At block 706, an orchestrator 420 workflow is triggered to monitor for catalog provisioning requests. For example, the orchestrator 420 works with the event broker 430, the catalog service 465, and the CBP 504 to monitor for selection of the blueprint 126 from the catalog 465, which triggers provisioning of virtual computing resources. FIG. 12 illustrates an example catalog interface 1200 from which a blueprint 126 and/or other service can be selected. When the blueprint 126 is selected, the blueprint 126 can be edited and/or executed to provision one or more services, components, etc. For example, FIG. 13 illustrates an example blueprint editing interface 1300 including a design canvas 1302 to graphically manipulate components in the blueprint 126. FIGS. 14-15 illustrate additional example blueprint editing interfaces 1400, 1500 in which a template 1402 can be selected for the blueprint 126 and/or machine resources 1502 can be specified for the blueprint 126.

At block 708, when a catalog provisioning request is detected, the event broker 430 is triggered (e.g., via pre-event, etc.) to evaluate each event in the catalog provisioning for subscribers and subscriber modification. For example, when the orchestrator 420 receives a request to provision a service (e.g., via a blueprint 126 selected from the catalog 465), the orchestrator 420 generates a composition or compilation 506, which calculates components in the selected blueprint 126 and their dependencies and performs a dependency check. If the dependencies are met, then the composition 506 starts to provision the components of the blueprint 126. Each component is associated with an event. When an event is detected (e.g., by the orchestrator 420 and its composition 506), the event broker 430 evaluates the associated event topic to identify and notify subscriber(s) 510. Each subscriber 510 having a (non-blocking) subscription to the event broker 430 is notified of the catalog request, and the event broker 430 evaluates events associated with the catalog request to generate event notifications to each subscriber 510 based on its particular event subscription(s). The event broker 430 awaits a response from blocking subscriber(s) 510 before proceeding but does not await a response from non-blocking subscriber(s) 510 before proceeding with a next event in the catalog request.

In certain examples, the subscriber 510 can subscriber to multiple events and/or can have multiple subscriptions to the same event. Each subscription can be blocking or non-blocking, for example. Thus, the subscriber 510 that intends to participate in extending and/or otherwise modifying the provisioning workflow (e.g., by supplying data and/or additional instruction to an event) can subscribe as blocking to modify workflow/parameter(s) associated with a particular event and/or as non-blocking to be notified of an event but not delay the event's execution (e.g., the composite blueprint component does not need to wait for the subscriber 510 to finish processing an event with a non-blocking subscription, etc.).

The event broker 430 serves as a publish/subscribe hub in the vA 320 to handle event subscriptions, provide notifications, and accommodate blocking subscriber(s) 510, for example. For example, the event broker 430 can maintain a list, table, etc., of subscribers 510 along with an indication of subscription(s) for each subscriber 510. Each subscription is indicated as blocking or non-blocking for the particular event and subscriber 510, for example. When the event broker 430 sends an event for a blocking subscription, the event broker 430 waits for the subscriber 510 to return the potentially modified event before proceeding to other, non-blocking subscribers.

At block 710, provisioning of resources is triggered for deployment. For example, a VM 114 and/or container 114*a* can be configured with an IaaS 508 and deployed for use as a cloud director, hypervisor, cloud infrastructure, etc., according to the selected blueprint 126.

FIG. 16 provides further detail regarding an implementation of evaluating events in a provisioning request to identify subscribers and subscriber modification (block 706) of the example flow diagram of FIG. 7. At block 1602, subscribers to the event broker 430 are notified of the catalog request. For example, non-blocking subscribers to the event broker 430 receive a notification from the event broker 430 regarding the catalog request for resource provisioning. At block 1604, for each component to be provisioned, an event is triggered. For example, an event topic such as blueprint component requested is triggered when a VM 114 and/or software component is provisioned for installation (e.g., as an IaaS 508, etc.). At block 1606, a pre-event instruction is generated for the event. For example, a dependency check between components can be instructed, a prerequisite check can be instructed, a dependent and/or prerequisite instruction can be provided to set up component provisioning, etc.

At block 1608, subscriber(s) 510 to the event are notified. For example, each subscriber 510 is notified by the event broker 430 regarding the pre-event instruction before the pre-event instruction is executed/implemented by the composition 506. The notification of the subscriber 510 by the event broker 430 triggers subscriber 510 review. At block 1610, the event broker 430 determines whether the subscriber 510 is a blocking subscriber. At block 1612, if the subscriber 510 is a blocking subscriber, then the blocking subscriber 510 is evaluated to determine whether the blocking subscriber 510 has a modification to the pre-event (e.g., a change to the pre-event instruction, an instruction to be executed before the pre-event instruction, etc.). If the blocking subscriber 510 has a modification (e.g., a change to the pre-event instruction, an additional instruction such as logging, configuring another system/device/process, other custom logic, etc.), then, at block 1614, the pre-event instruction is updated to reflect the modification by the blocking subscriber 510. At block 1616, the pre-event instruction is executed/implemented by the composition 506. For example, the orchestrator 420 updates the composition 506 based on the pre-event instruction.

At block 1618, the component is provisioned according to the blueprint 126. For example, a VM 114, container 114*a*, vRA 320, component server 330, service 508, etc., is provisioned according to the selected blueprint 126 following the pre-event instruction.

At block 1620, a post-event instruction is generated. For example, an instruction to verify, log, connect, evaluate dependency(-ies), etc., can be provided for the composition 506. At block 1622, before the post-event instruction can be executed/implemented by the composition 506, subscriber(s) 510 to the event are notified. For example, each subscriber 510 is notified by the event broker 430 regarding the post-event instruction. The notification of the subscriber 510 by the event broker 430 triggers subscriber 510 review. At block 1624, the event broker 430 determines whether the subscriber 510 is a blocking subscriber. At block 1626, if the subscriber 510 is a blocking subscriber, then the blocking subscriber 510 is evaluated to determine whether the blocking subscriber 510 has a modification to the post-event (e.g., a change to the post-event instruction, an instruction to be executed before the post-event instruction, etc.). If the blocking subscriber 510 has a modification (e.g., a change to the post-event instruction, an additional instruction such as logging, configuring another system/device/process, other custom logic, etc.), then, at block 1628, the post-event instruction is updated to reflect the modification by the blocking subscriber 510. At block 1630, the post-event instruction is implemented by/in the composition 506. For example, the orchestrator 420 updates the composition 506 based on the post-event instruction.

At block 1632, the provisioning blueprint is evaluated to determine whether additional component(s) remain to be processed. If so, then control reverts to block 1604 to trigger a next event for the catalog request. Once processing has finished, at block 1634, the results of the composition 506 are published to the catalog 465. Control then returns to block 708 to trigger resource provisioning by the IaaS and deploy provisioned resource(s) for use.

Figure 17:
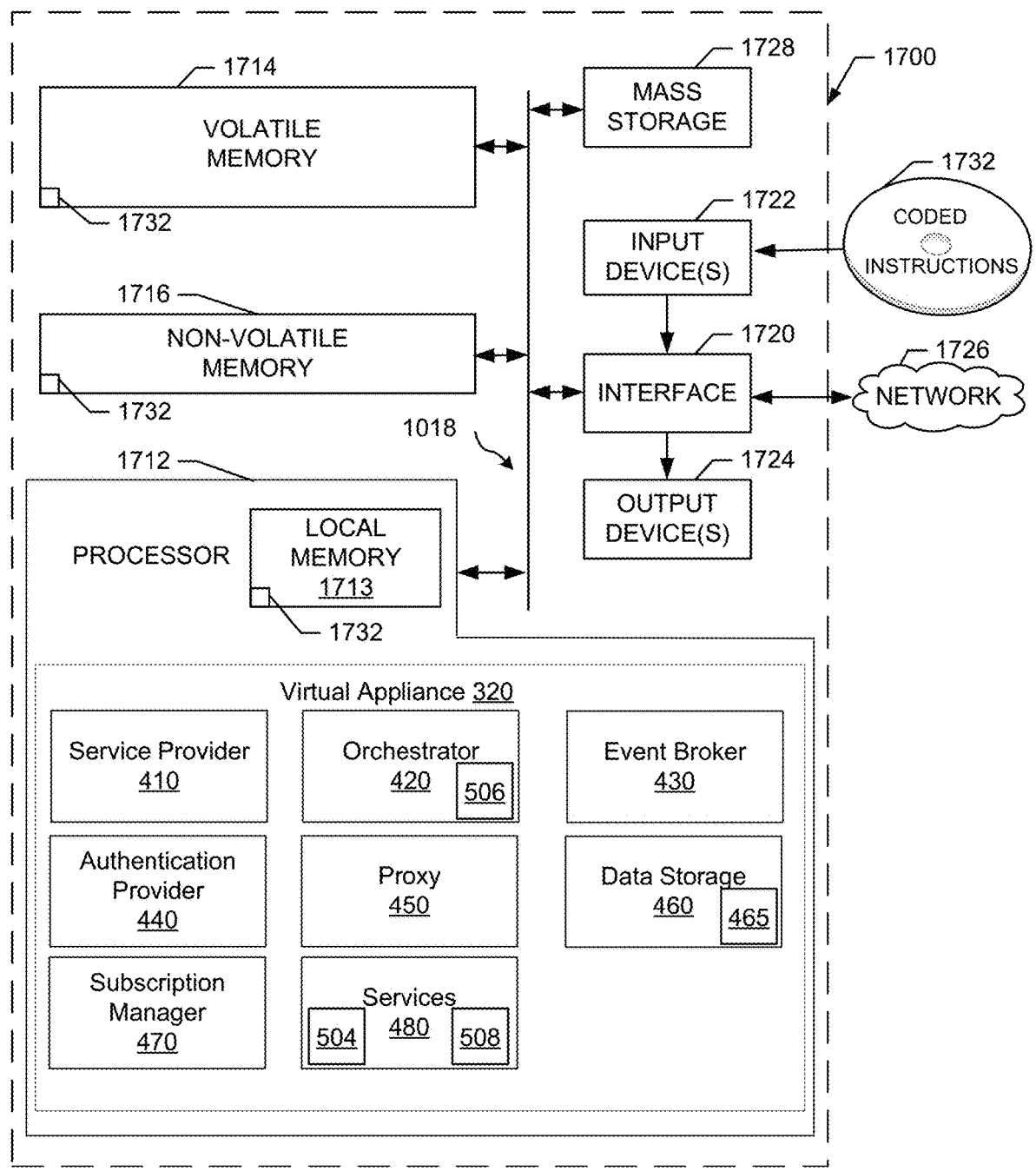
FIG. 17 is a block diagram of an example processing platform structured to execute the example computer readable instructions of FIGS. 7 and/or 16 and to implement the example virtual appliance of FIGS. 4-5.

FIG. 17 is a block diagram of an example processor platform 1700 structured to execute the instructions of FIGS. 7 and 16 to implement the example systems, operation, and management of FIGS. 1-6. The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache), and executes instructions to implement the example system 100 or portions thereof, such as the vA 320-324, component server 330-336, management endpoint 340-344, and management agent 350-356. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a keyboard, a button, a mouse, a touchscreen, a track-pad, a trackball, isopoint and/or a voice recognition system. In some examples, the input device(s) 1722 are used to implement the tenant administrator work station 116 (see FIG. 1).

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor. In some examples, the output device(s) 1724 are used to implement the tenant administrator work station 116 (see FIG. 1).

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include flash devices, floppy disk drives, hard drive disks, optical compact disk (CD) drives, optical Blu-ray disk drives, RAID systems, and optical digital versatile disk (DVD) drives.

Coded instructions 1732 representative of the example machine readable instructions of FIGS. 6 and 7 may be stored in the mass storage device 1728, in the volatile memory 1714, in the non-volatile memory 1716, and/or on a removable tangible computer readable storage medium such as a CD or DVD.

In the example of FIG. 17, the processor 1712 implements the virtual appliance 320 (and vAs 322-324) and the component server 330 (and servers 332-336) and their components including the service provisioner 410, orchestrator 420, event broker 430, authentication provider 440, proxy 450, data storage 460, catalog 465, subscription manager 470, the services 480, CBP 504, composition 506, IaaS 508, etc. In certain examples, as discussed herein, the hardware of processor 1712 is virtualized using virtualization such as VMs and/or containers. In the example of FIG. 17, the virtual appliance 320 can be implemented by one or more VMs or containers, so as to virtualize the hardware of processor 1712.

Thus, certain examples improve provisioning of virtual computing resources in an environment, such as a cloud computing environment. Certain examples provide a technical improvement of identifying and prioritizing blocking subscribers to modify instruction and/or execution additional instruction before and/or after a provisioning event. Certain examples facilitate identification and tracking of blocking versus non-blocking subscribers. Certain examples provide improved subscription management and event topic notification to facilitate efficient communication and use of computing resources for interleaved task execution.

Certain examples enable client extensibility during provisioning of a composite blueprint. By enabling blocking subscribers to preempt, delay, and/or otherwise prioritize tasks over a provisioning event, a client functionality can be extended beyond a typical provisioning workflow. By defining and modifying event subscriptions and category (e.g., blocking, non-blocking, etc.), a subscriber (e.g., a user, a program, a device, a system, etc.) can introduce additional functionality extended into the provisioning event workflow for computing resources, for example.

Certain examples provide a virtual appliance in a cloud computing environment. The example virtual appliance includes an orchestrator to facilitate provisioning of a virtual computing resource based on a blueprint, the provisioning associated with an event defined by the blueprint. The example virtual appliance also includes an event broker to maintain a set of subscribers to the event broker, each of the set of subscribers further subscribing to at least one event topic through the event broker, the event broker to trigger a notification of a first subscriber to a first event topic associated with the event when the event broker determines that the first subscriber is a blocking subscriber for the first event topic, the event broker to facilitate modification of the event by a blocking subscriber but not by a non-blocking subscriber.

In certain examples, when the first subscriber is a blocking subscriber and has a modification of the event, the event broker is to facilitate modification of the event prior to notifying non-blocking subscribers of the event. In certain examples, when the first subscriber is a blocking subscriber and does not have a modification of the event, the event broker is to delay execution of the event through the notification of the first subscriber.

In certain examples, the blueprint is selected from a catalog service. In certain examples, the blueprint defines an infrastructure as a service to be provisioned as one or more virtual computing resources. In certain examples, the blueprint includes at least one of a pre-event or a post-event. In certain examples, the blocking subscriber is to modify at least one of the pre-event or the post-event. In certain examples, the orchestrator is to implement a composition to facilitate the provisioning of the virtual computing resource based on the blueprint. In certain examples, the blueprint includes a multi-machine blueprint associated with a composite blueprint service.

Certain examples provide a method including evaluating, by executing an instruction using a processor, for each subscriber to an event broker having at least one event topic subscription through the event broker, a received trigger associated with an event involved in provisioning of a virtual computing resource according to a blueprint, to identify a first subscriber to a first event topic associated with the event. The example method includes determining, by executing an instruction using the processor, whether the first subscriber is a non-blocking subscriber or a blocking subscriber. The example method includes facilitating, by executing an instruction using the processor, notification of the first subscriber regarding the event when the first subscriber is a blocking subscriber, wherein the event broker is to facilitate modification of the event by a blocking subscriber but not by a non-blocking subscriber.

In certain examples, when the first subscriber is a blocking subscriber and has a modification of the event, the event broker is to facilitate modification of the event prior to notifying non-blocking subscribers of the event. In certain examples, when the first subscriber is a blocking subscriber and does not have a modification of the event, the event broker is to delay execution of the event through the notification of the first subscriber.

In certain examples, the blueprint is selected from a catalog service. In certain examples, the blueprint defines an infrastructure as a service to be provisioned as one or more virtual computing resources. In certain examples, the blueprint includes at least one of a pre-event or a post-event. In certain examples, the blocking subscriber is to modify at least one of the pre-event or the post-event. In certain examples, the blueprint includes a multi-machine blueprint associated with a composite blueprint service.

Certain examples provide a non-transitory computer readable storage medium comprising computer readable instructions. The example instructions, when executed, cause at least one processor to at least evaluate, for each subscriber to an event broker having at least one event topic subscription through the event broker, a received trigger associated with an event involved in provisioning of a virtual computing resource according to a blueprint, to identify a first subscriber to a first event topic associated with the event. The example instructions, when executed, cause at least one processor to at least determine whether the first subscriber is a non-blocking subscriber or a blocking subscriber. The example instructions, when executed, cause at least one processor to at least facilitate notification of the first subscriber regarding the event when the first subscriber is a blocking subscriber, wherein the event broker is to facilitate modification of the event by a blocking subscriber but not by a non-blocking subscriber, facilitate, by executing an instruction using the processor.

In certain examples, when the first subscriber is a blocking subscriber and has a modification of the event, the event broker is to facilitate modification of the event prior to notifying non-blocking subscribers of the event. In certain examples, when the first subscriber is a blocking subscriber and does not have a modification of the event, the event broker is to delay execution of the event through the notification of the first subscriber.

In certain examples, the blueprint is selected from a catalog service. In certain examples, the blueprint defines an infrastructure as a service to be provisioned as one or more virtual computing resources. In certain examples, the blueprint includes at least one of a pre-event or a post-event. In certain examples, the blocking subscriber is to modify at least one of the pre-event or the post-event. In certain examples, the blueprint includes a multi-machine blueprint associated with a composite blueprint service. In certain examples, the at least one processor includes an orchestrator and an event broker, wherein the orchestrator is to implement a composition to facilitate the provisioning of the virtual computing resource based on the blueprint.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   instructions; and
   a processor to at least:
      associate a subscription for a service with an event topic according to a blueprint;
      determine a type of the subscription as blocking or non-blocking;
      activate the subscription for the service;
      when provisioning of resources is triggered, control interaction of the service with the provisioning based on the blueprint and the type of the subscription; and
      when the type of the subscription is blocking, send an event associated with the provisioning to the service.

2. The apparatus of claim 1, further including a catalog from which the blueprint is selected.

3. The apparatus of claim 2, further including an orchestrator, the orchestrator to monitor for selection of the blueprint from the catalog, selection of the blueprint from the catalog to trigger provisioning of a computing resource associated with the blueprint.

4. The apparatus of claim 3, wherein the computing resource includes a virtual computing resource.

5. The apparatus of claim 1, wherein, when the type of the subscription is non-blocking, the processor is to notify the service of the provisioning.

6. The apparatus of claim 1, wherein, when the type of the subscription is blocking, the processor is to pause the provisioning for the service to modify an event associated with the provisioning before the provisioning continues.

7. The apparatus of claim 1, wherein the processor is to facilitate creating, editing, publishing, unpublishing, and deleting of the subscription.

8. The apparatus of claim 1, further including an interface to enable selection of the subscription for the service.

9. A non-transitory computer readable storage medium comprising instructions that, when executed, cause a processor to at least:
   configure a subscription for a service with an event topic according to a blueprint;
   associate a type of the subscription as blocking or non-blocking;
   activate the subscription for the service;
   when provisioning of resources is triggered, control interaction of the service with the provisioning based on the blueprint and the type of the subscription; and
   when the type of the subscription is blocking, send an event associated with the provisioning to the service.

10. The computer readable storage medium of claim 9, wherein the instructions, when executed, cause the processor to monitor for selection of the blueprint from a catalog, selection of the blueprint from the catalog to trigger provisioning of a computing resource associated with the blueprint.

11. The computer readable storage medium of claim 9, wherein, when the type of the subscription non-blocking, the processor is to notify the service of the provisioning.

12. The computer readable storage medium of claim 9, wherein, when the type of the subscription is blocking, the processor is to pause the provisioning for the service to modify an event associated with the provisioning before the provisioning continues.

13. The computer readable storage medium of claim 9, wherein the instructions, when executed, cause the processor to facilitate creating, editing, publishing, unpublishing, and deleting of the subscription.

14. A method to manage a subscription for provisioning of resources, the method comprising:
   associating, by executing an instruction using a processor, a subscription for a service with an event topic according to a blueprint;

determining, by executing an instruction using the processor, a type of the subscription as blocking or non-blocking;

activating, by executing an instruction using the processor, the subscription for the service;

when provisioning of resources is triggered, controlling, by executing an instruction using the processor, interaction of the service with the provisioning based on the blueprint and the type of the subscription; and when the type of the subscription is blocking, sending an event associated with the provisioning to the service.

15. The method of claim 14, further including monitoring for selection of the blueprint from a catalog, selection of the blueprint from the catalog to trigger provisioning of a computing resource associated with the blueprint.

16. The method of claim 14, wherein, when the type of the subscription non-blocking, further including notifying the service of the provisioning.

17. The method of claim 14, wherein, when the type of the subscription is blocking, further including pausing the provisioning for the service to modify an event associated with the provisioning before the provisioning continues.

* * * * *